United States Patent [19]

Knox

[11] 3,842,311

[45] Oct. 15, 1974

[54] S-CORRECTED VERTICAL DEFLECTION CIRCUIT

[75] Inventor: James D. Knox, Portsmouth, Va.

[73] Assignee: General Electric Company, Portsmouth, Va.

[22] Filed: Jan. 8, 1973

[21] Appl. No.: 321,850

[52] U.S. Cl. .......... 315/27 TD

[51] Int. Cl. .......... H01j 29/70

[58] Field of Search .......... 315/26, 27 TD, 27 R, 28, 315/29

[56] References Cited

UNITED STATES PATENTS

| | | | |
|---|---|---|---|
| 2,911,566 | 11/1959 | Taylor et al. | 315/27 TD |
| 3,134,928 | 5/1964 | Freedman | 315/27 TD |
| 3,488,554 | 1/1970 | Volge | 315/27 TD |
| 3,492,527 | 1/1970 | Griffey | 315/27 TD |

*Primary Examiner*—Maynard R. Wilbur
*Assistant Examiner*—J. M. Potenza

[57] ABSTRACT

The vertical deflection amplifier in a television receiver is provided with negative feedback responsive to deflection current and amplifier voltage. The feedback, comprising passive filtering elements, alters the transfer characteristic of the amplifier to have the effect of a pass band about the sweep frequency to provide S-shaping of the sawtooth deflection current thereby correcting for "flat face" picture distortion.

6 Claims, 3 Drawing Figures

S-CORRECTED VERTICAL DEFLECTION CIRCUIT

BACKGROUND OF THE INVENTION

This invention relates to a shaping circuit in the form of a feedback network for an amplifier. More particularly, it relates to the vertical deflection amplifier in a television receiver having a feedback circuit responsive to deflection winding current to correct the waveform of the current by feedback shaping to overcome sweep distortion.

The television image, which is in the form of modulations of the electron beam of the cathode ray tube in a television receiver, is displayed on the face of the picture tube repeatedly by sweeping the beam across the face of the tube both in horizontal and vertical directions. This sweep is caused by the application of ramp-like current pulses to the deflection windings. Since equal increments of deflection current cause equal angles of deflection of the electron beam it is natural to apply linearly increasing sawtooth shaped current pulses to sweep the electron beam across the face of the tube. However, in the case of large screen, large deflection angle picture tubes, distortion commonly referred to as the flat face effect is experienced. This effect is the result of the beam hitting a flat surface such that the equal increments of deflection of the beam do not intersect equal areas on the face of the cathode ray tube. Thus, correction of the deflection current is required to cause the beam to intersect equal areas and thus provide a linear scan. The type of correction required for the deflection current is referred to as S-correction due to the fact that the beginning of the sawtooth current waveform and the end of the sawtooth waveform is compressed to give the appearance of an S.

Many varieties of drive circuits for vertical deflection of the electron beam having various types of corrective circuitry for bringing about S-correction of the deflection current have been proposed. A problem that is common with many such circuits arises from the need to provide linear amplification of the sawtooth waveform to faithfully reproduce and amplify the sawtooth while at the same time correcting the initial and end portions of each pulse to provide S-correction. Each of these requirements i.e., linearity of response of the amplifier and controlled distortion of the sawtooth voltage being applied to the deflection windings, have been considered to be seperate and sometimes even conflicting problems. This is because linearity is desired for faithful reproduction of the sawtooth waveform while S-correction requires distortion of the sawtooth waveform. Independent design attention to these problems has often resulted in expensive circuits. To achieve linearity of amplification most circuits employ a linearity control for adjustment in the course of manufacture to compensate for variations in the components of the amplifier. It has been found, in the course of developing the present invention, that both linearity of amplification and S-correction can be achieved by a simple inexpensive negative feedback circuit for the vertical deflection amplifier that employs passive fixed elements and does not require a linearity control.

It has been found that by providing a low pass filter circuit in the feedback network and also a high pass filter in this network that shaping of both ends of the sawtooth is possible. These filter circuits are responsive to deflection current to provide correction and shaping of this current. This circuit is achieved at minimum expense by employing a common resistor to serve both the low pass and high pass filters. The feedback circuit also includes a resistor responsive to the voltage across the deflection windings and coupled to the same input of the amplifier as the high pass and low pass filters. This voltage responsive resistor controls the shaping effect of the filter circuits by altering the Q thereof as well as providing DC stability for the amplifier.

BRIEF DESCRIPTION OF THE DRAWINGS

Other features and objects of the present invention, as well as a more complete understanding may be obtained from the following detailed description of the invention taken with reference to the drawings, in which.

DETAILED DESCRIPTION

Figure 1:
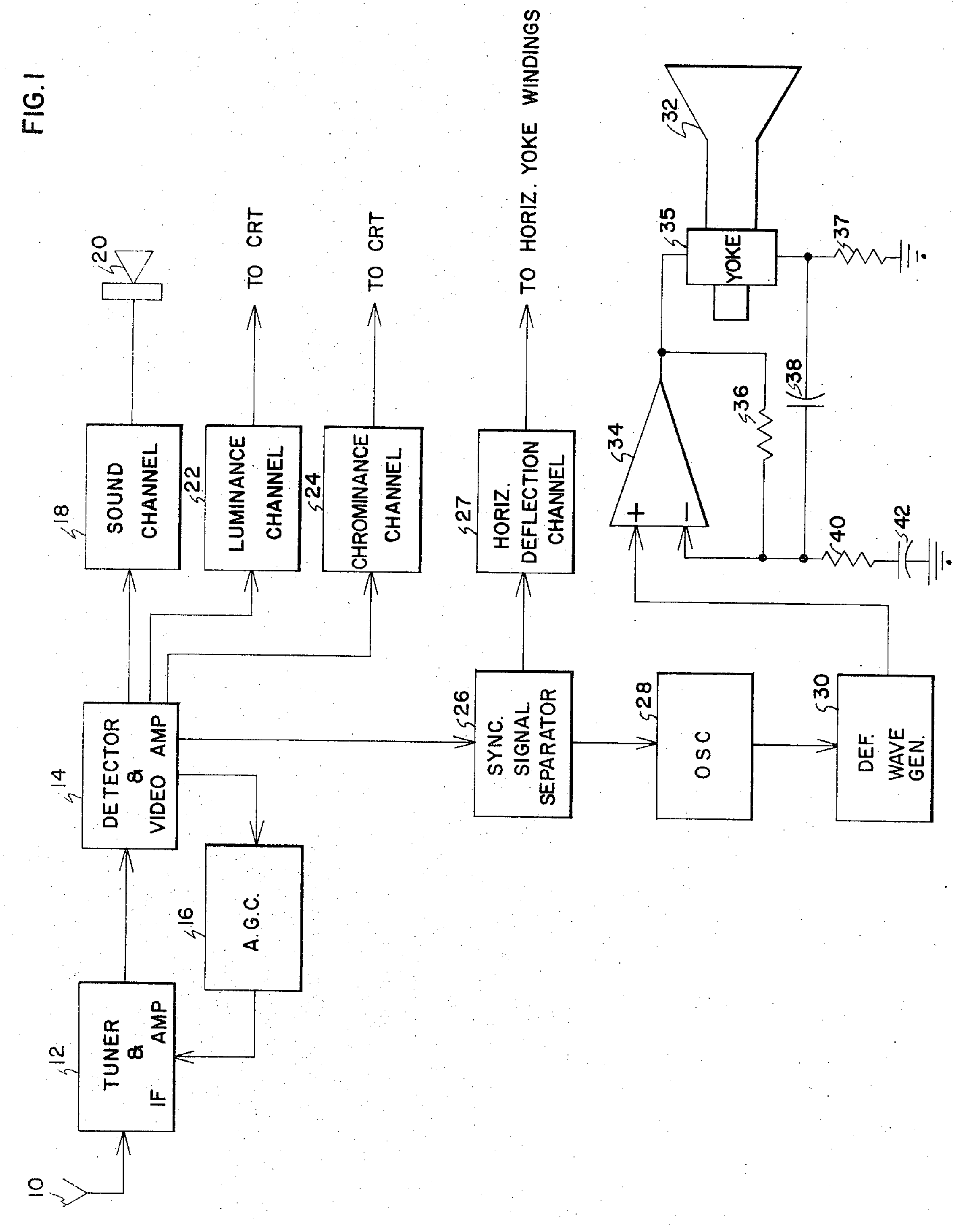
FIG. 1 is a block diagram of a portion of a television receiver in which the feedback circuit is shown schematically.

Referring to FIG. 1, there is shown in block diagram form portions of a television receiver including an antenna 10 which applies the broadcasted video and audio information to a combined tuner demodulator and IF amplifier stage 12. The intermediate frequency information provided by this stage is applied to a second detector and video amplifier stage 14. This stage provides a first output to a sound channel 18 which includes an audio amplifier to provide audio information to a speaker indicated at 20. The video amplifier 14 also provides luminance information through a luminance channel 22 to the cathode ray tube and chrominance information through a chrominance channel 24 to the cathode ray tube. A portion of the signal detected by the detector 14 is applied in the form of feedback for controlling the gain of the IF amplifier stage as indicated by the automatic gain control block 16. The remaining output of the detector and video amplifier stage 14 is applied to the sync signal separator 26 which derives synchronizing pulse information from the detected video for the horizontal and vertical deflection channels to insure synchronous operation thereof. One output of the sync signal separator 26 is shown being applied to the horizontal deflection channel 27 which in turn applies drive voltages to the horizontal deflection windings of the yoke, as indicated in the figure. A second output from the sync signal separator 26 is applied to the vertical deflection channel to synchronize an oscillator 28 which derives a 60 Hz signal. This 60 Hz signal is applied to the deflection wave generator 30 for the creation of a 60 Hz sawtooth voltage.

The sawtooth wave generated by generator 30 is applied to the vertical deflection windings of the yoke 35, which is shown mounted on the neck of the cathode ray tube 32, by means of an amplifier 34. This amplifier may suitably comprise either a DC coupled, a transformer coupled or a capacitor coupled amplifier such as the kind normally provided for audio amplification and may preferably comprise the DC coupled amplifier shown in FIG. 2.

Also shown in FIG. 1 is the feedback circuit for the vertical drive amplifier 34 which comprises the subject matter of the present invention. A first portion of the feeback circuit comprises a resistor 36 responsive to the voltage output of the amplifier 34, i.e., the voltage across the deflection windings, this resistor being returned to the negative input of the amplifier. A second portion of the feedback circuit includes a capacitor 38 responsive to deflection winding current as represented by the voltage appearing across a resistor 37 in series with the deflection windings, this capacitor being returned to the negative input of the amplifier 34. The resistor 37 is a sampling resistor of low resistance, in the order of one ohm. A resistor 40 and a capacitor 42 connected in series provide a shunt or return path for the capacitor 38. Connected in the manner shown, the resistor 40 together with the capacitor 38 comprise a low pass filter to shape the beginning of the deflection winding sawtooth current, whereas capacitor 42 in conjunction with resistor 40 provide a high pass filter to provide shaping of the end of the sawtooth deflection current as the sawtooth deflection signal appears at the positive input of amplifier 34.

It will be recognized that if a 60 Hz sawtooth is slightly differentiated, such as by a high pass filter with a time constant of .02 sec., it will become slightly rounded and show up as end of trace compression. A simple differentiation circuit would comprise a capacitor connected in series between the source of 60 Hz signal and the load and a resistor connected in shunt across the load. Likewise, if the sawtooth is slightly integrated such as by a low pass filter with a time constant of 0.5 msec. the initiation of the trace will become slightly compressed. A simple integration circuit would comprise a resistor in series connection between the 60 Hz sweep signal and the load and a capacitor connected across the load.

The composite effect of the high pass and low pass filters on a 60 Hz sawtooth voltage is the compression of both ends of the linear size or sweep portion of each pulse to result in an S-shape. The two filters comprise a band pass constraint on the 60 Hz signal having preferably high frequency roll-off at 300 Hz and low frequency roll-off at 8 Hz.

In the feedback circuit of the present invention a variation of the simple high pass and low pass filters is found. In the feedback circuit, the filtering provided by capacitors 38 and 42 and resistor 40 adjusts the transfer characteristic of the amplifier to provide the same shaping effect on deflecting winding current. Thus, while there is not the same time constants employed in the feedback arrangement the effect on sawtooth shaping is as if a band pass constraint were applied about the 60 Hz signal.

By combining both a high pass filter and a low pass filter in the negative feedback network of amplifier 34 the transfer characteristic of this amplifier is peaked in a range below 60 Hz. The low frequency roll-off of this peaked response is occasioned by capacitor 38 in conjunction with resistor 40, the high frequency roll-off of the characteristic being determined by capacitor 42 and resistor 40. By proper selection of the values of the capacitors and resistor the peaking of the amplifier transfer characteristic may be adjusted to produce the same S-correction of deflection winding current experienced with the simple band pass filtering described above. The capacitors 38 and 42 may preferably each be 1 microfarad and resistor 40 be 15 kilohms to produce a peaking of the amplifier response between 5 Hz and 20 Hz.

Resistor 36 can be considered a separate feedback path for purposes of discussion, but, as will be pointed out below, it has a profound effect on the shaping of deflection winding current. This resistor as has been stated above is responsive to the voltage output of amplifier 34. This resistor in conjunction with the input resistance of the amplifier establishes the DC bias of the amplifier and by its negative feedback function provides DC stabilization of the amplifier. This resistor also feeds back a portion of the sawtooth voltage to the negative input terminal of the amplifier to compensate for irregularities in output voltage as may be occasioned for example by nonlinearities of the active devices in the amplifier, by transformer output coupling, or by zero crossing distortion. An additional function performed by each of the feeback loops is amplifier protection. The resistor 36 provides protection for the amplifier against the yoke being open circuited or disconnected from the amplifier, while the FB loop responsive to yoke current as sampled by resistor 37 protects the amplifier from the results of short circuits.

It will be recognized that the connection of resistor 36 to the point of interconnection of the low pass filter made up of capacitor 38 and resistor 40 and the point of connection to the amplifiers of the high pass filter made up of resistor 40 and capacitor 42 has an effect on the operation of these filters. Resistor 36 provides an alternate current path for both of the filters, this resistor being effectively in parallel with resistor 40 for the low pass filter and providing an alternate path causing some loading of the high pass filter. The total effect of resistor 36 is to lower the Q of the time constant circuits thus providing greater linearity of the deflection winding current as will be discussed with reference to FIG. 3 below.

Figure 2:
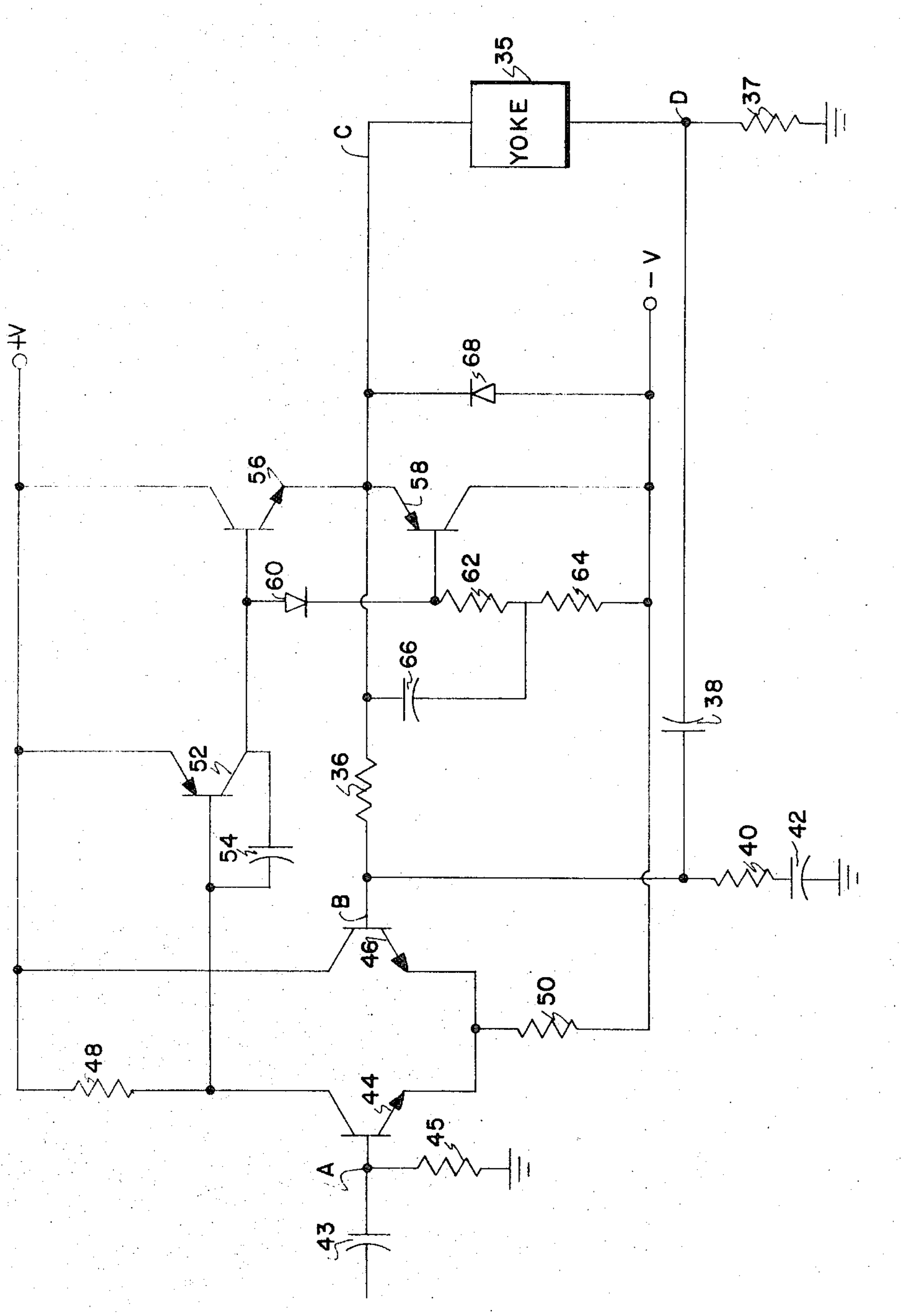
FIG. 2 is a circuit diagram of a vertical drive amplifier employing the feedback circuit of the present invention.

Turning now to FIG. 2, a preferred embodiment of the amplifier 34 is shown in detail with the feedback elements again shown and having the same reference numerals. Amplifier 34 basically comprises a differential input amplifier including transistors 44 and 46 which drive a complementary pair of output transistors 56 and 58 by means of transistor amplifier 52. The sawtooth voltage generated by the deflection wave generating circuit 30, as shown in FIG. 1 and applied to the positive input terminal of amplifier 34, is shown being coupled to the base terminal of transistor 44 by an input blocking capacitor 43.

Figure 3:
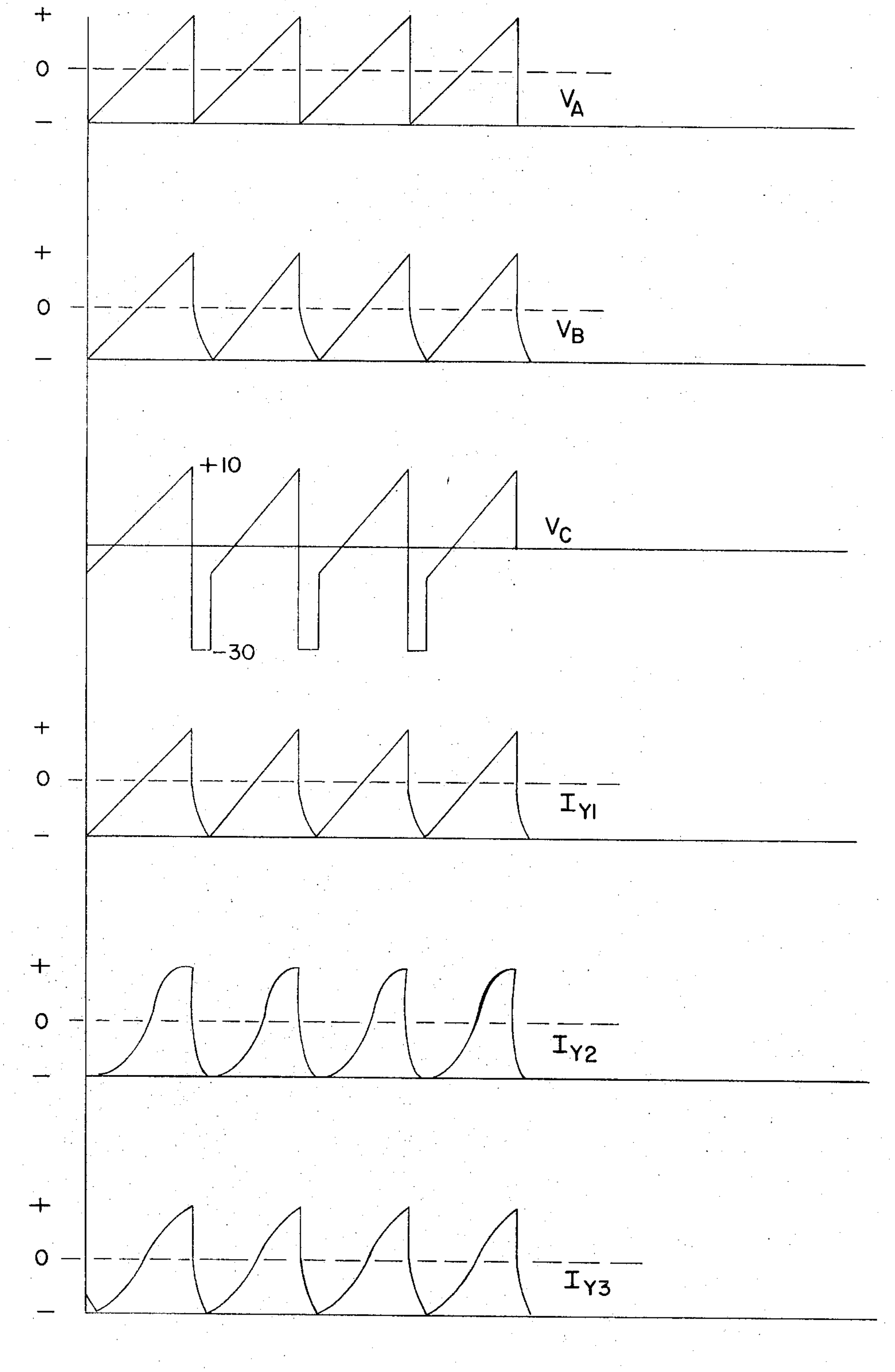
FIG. 3 shows waveforms of various voltages and currents found in the circuit of FIG. 2.

Since the amplifier is direct coupled, the output voltage must swing about zero and have a zero voltage DC valve as depicted by $V_C$ in FIG. 3. To assure that the center of this voltage is maintained at zero, a split power supply (+V, −V) and a differential amplifier are employed. Resistor 45, connected to the base of transistor 44 and to ground or zero DC potential, establishes the DC reference level for the amplifier 34. DC degenerative feedback is referred to the base of transistor 46 by resistor 36. Thus the differential pair will stabilize the output (C) at the same potential as that maintained by resistor 45.

The sweep voltage applied to the base of transistor 44, designated A in FIG. 2 and shown in FIG. 3 as the voltage $V_A$, is a sawtooth voltage increasing linearly from a negative voltage to a positive voltage. When the voltage $V_A$ begins its positive excursion, transistor 44 increases its conduction, drawing current from the base of transistor 52, causing in turn this transistor to conduct more completely. The greater conduction of transistor 52 causes base current to flow in output transistor 56, turning this transistor on to supply the positive portion of the deflection voltage $V_C$. Transistor 58 is in a state of nonconduction during the positive portion of $V_C$.

At the end of the sweep cycle the sawtooth voltage collapses at the input A. Transistor 56 turns off and yoke current drops to zero through diode 68. The remainder of retrace is accomplished by the lower conduction of transistors 44 and 52 permitting transistor 58 to turn on hard. This transistor remains in the ON state until the feedback from D senses that the negative voltage across resistor 37 equals that at point A. Transistor 58 then decreases its conduction until the cycle is completed.

The charge on capacitor 66 causes a current to flow through resistor 62 from the base of transistor 58 to serve as a supply for this transistor enabling its conduction during the negative half cycle. Diode 60 clamps the bases of transistors 56 and 58 at less than the sum of their turn-on voltages insuring that both are never in conduction simultaneously.

Reference may now be had to FIG. 3 for a better understanding of the operation of the amplifier 34 and the affect the feedback circuit has on its operation. The first waveform shown in FIG. 3 is the voltage V which appears at point A, the base of transistor 44. This is the linear sawtooth voltage applied to the amplifier by the deflection wave generator 30. The voltage $V_B$ is the voltage appearing at the negative input of the amplifier 34 which is the base of transistor 46 of the differential amplifier. This voltage is applied to point B by feedback resistor 36 and also by the filter feedback network and is substantially the same as the voltage applied to the base of transistor 44. However, due to the effect of the inductive load, the transition between negative going and positive going voltage swing is not an abrupt change as in $V_A$ but is somewhat integrated to exhibit a more gradual transition. It is noted that the amplifier output voltage $V_C$, a portion of which is delivered to point B by resistor 36, exhibits much more fully the inductive effects of the abrupt change of the sawtooth voltage from a positive value to a negative value. Due to the greater effect of the filter network on the amplifier than that exerted by resistor 36, the voltage $V_B$ does not exhibit the retrace notch exhibited by the amplifier output voltage $V_C$. The voltage $V_C$, as indicated, swings from the positive supply value +V of 10 volts to the −V supply value of 30 volts.

Deflection winding current represented by the voltage appearing across the low resistance sampling resistor 37 is shown by the waveforms $I_{Y1}$, $I_{Y2}$ and $I_{Y3}$. $I_{Y1}$ illustrates the shape of the current when point D is connected to point B in the circuit by a resistor. Thus, $I_{Y1}$ represents deflection winding current as it would appear without the benefit of the current responsive feedback circuit of the present invention. It is noted that the $I_{Y1}$ waveform is substantially identical to the voltage waveform $V_B$.

When yoke current is applied back to amplifier input B by means of the filter feedback circuit of the present invention, it has its initial and final portions compressed to have the S-shape required to alleviate flat-face distortion. $I_{Y2}$ shows the pronounced S-shaped waveform of the deflection winding current shaped by the filter feedback network.

The current waveform $I_{Y3}$ illustrates the affect feedback resistor 36 has on the filter network and the resultant linearization of the current waveform. Resistor 36, as has been discussed, lowers the Q of the response of the amplifier in the peaked range so that the S-correction does not extend throughout the trace portion of the sawtooth current. With resistor 36, control is provided to insure that the mid portion of the sweep current is linear and only the end portions thereof are compressed.

The invention described is a feedback circuit for a vertical deflection drive amplifier that provides shaping of the deflection current while at the same time avoiding response to the variations in amplifier parameters by means of the negative feedback about the amplifier. The feedback circuit provides linearity of amplification using any amplifier configuration and provides S-correction of deflection winding current with the use of only simple, non-critical, passive circuit elements. While a particular embodiment has been described it should be understood by those skilled in the art that there are many variations of this preferred embodiment and that the invention is not limited by the particular example set forth but only by the appended claims.

What is claimed and desired to secure by letters patent of the United States is:

1. In a television receiver having a cathode ray tube with vertical deflection windings for sweeping an image across the face of said cathode ray tube in a vertical direction, a vertical deflection drive circuit comprising:

deflection wave generating means for generating a linear recurrent deflection wave of given frequency, an amplifier for applying said recurrent deflection wave to said vertical deflection windings in modified form, first feedback means responsive to deflection winding current to degeneratively control the transfer characteristic of said amplifier so that an S-shaped characteristic is imparted to said recurrent deflection wave, and second feedback means responsive to the voltage output of said amplifier to further degeneratively control the transfer characteristic of said amplifier and modify the effect of said first feedback means.

2. The deflection drive circuit recited in claim 1 wherein said first feedback means includes a high pass filter and a low pass filter to impart a bandpass transfer characteristic to said amplifier.

3. The deflection drive circuit recited in claim 2 wherein said low pass filter comprises a capacitor responsive to deflection winding current at one terminal thereof and coupled at its other terminal both to an input of said amplifier and to a current return path including a resistor, and said high pass filter includes said resistor and a capacitor in series therewith, said high pass filter being coupled to said amplifier input.

4. The vertical deflection drive circuit recited in claim 3 wherein the values of said resistor and capacitors are selected to provide a peaked response for said amplifier below said given frequency.

5. The vertical deflection drive circuit recited in claim 4 wherein said second feedback means lowers the Q of the filters of said first feedback means to limit the effect of said first feedback means to shaping only the end portions of each sweep segment of said recurrent deflection waveform.

6. The vertical deflection drive circuit recited in claim 5 wherein said second feedback means establishes the DC bias level for said amplifier.

* * * * *